Patented Dec. 4, 1951

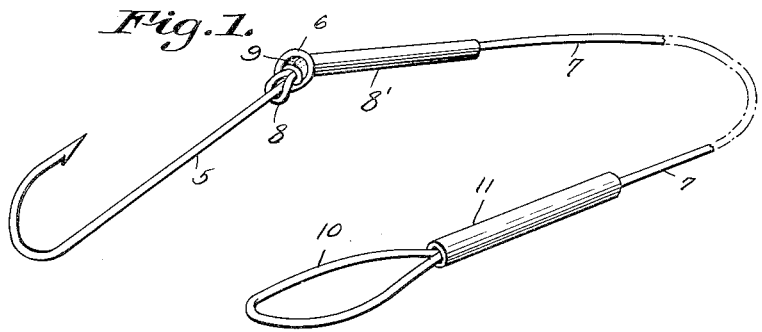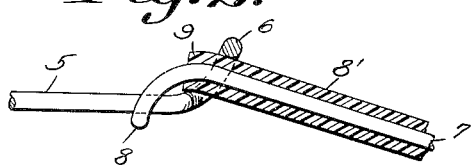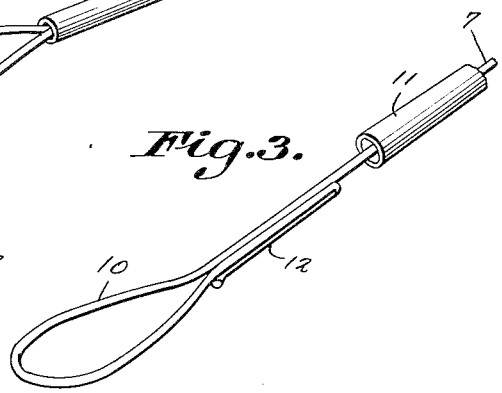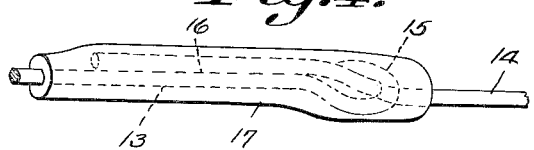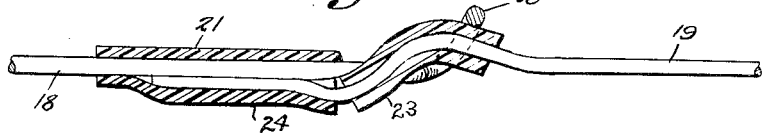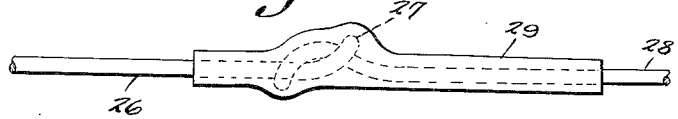

2,577,466

UNITED STATES PATENT OFFICE 2,577,466

METHOD OF JOINING LEADERS TO FISHHOOKS

Winfield W. Jones, Oceanville, N. J.

Application May 10, 1948, Serial No. 26,008

3 Claims. (Cl. 154—118)

This invention relates to a plastic sleeve construction for securing the shank of a fish hook to a leader, and for securing the loop at the other end of the leader.

By way of background, it is well known that a fish hook leader is usually of catgut, nylon, or the like, and is generally secured to a fish hook by wrapping both a portion of the shank of the hook and of the leader with thread, which is then cemented.

This construction has disadvantages, in that in the first place, the operation requires time, the connection may be loosened through hard use, and there may be chafing and wear of the leader at the point of connection to the hook.

The primary object of the present invention is to eliminate these disadvantages by providing a plastic sleeve method of securing a leader to a hook, the method being simple, relatively inexpensive, and providing a very strong connection which will not tend to loosen or wear.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings,

Figure 1 is a perspective view of a hook and leader, wherein plastic sleeves are used at both the hook end and the line end of the leader.

Fig. 2 is a fragmentary and enlarged longitudinal section through the hook connection of Fig. 1.

Fig. 3 is a perspective view of the line end of the leader, at an intermediate step during the process.

Fig. 4 is a perspective view of a modified connection.

Fig. 5 is a longitudinal section through another modified connection.

Fig. 6 is a side elevation of a third modification.

Referring to the drawings in detail and considering Figs. 1 and 2, the reference character 5 designates a hook having the usual eye 6. A leader is designated 7 and preferably is of braided wire material having the characteristic of resistance to corrosion.

In these figures, I first pass what may be termed the hook end of the leader through the eye 6, and loop it around the shank of hook 5 as at 8. The free end of the leader is now returned through eye 6 so as to extend backwardly a suitable distance alongside the incoming portion of the leader 7.

A plastic sleeve is designated 8' and in making the connection, I first immerse this sleeve in a dilator solution, so that its diameter will be increased considerably. The sleeve is then passed over the line end of the leader 7, drawn along the leader until it surrounds the longitudinally engaging portions of the leader at the hook end thereof, and then allowed to shrink to said portions. The shrinking results from evaporation of the highly volatile chemical used in the dilator solution. As this chemical evaporates, the plastic sleeve will regain its original size and texture, thereby causing a tight compression of the sleeve to the contacting portions of the leader, so that the curing of the sleeves secures the connection very tightly.

By reference particularly to Fig. 2, it will be observed that one end of the sleeve is extended through the eye 6 of the hook while the sleeve is still in a pliable and stretchable form. On shrinking of the sleeve, this end will remain at all times positioned through the eye 6, as shown at 9, thus to prevent chafing or wear of the leader at this critical point.

At the line end of the leader, it is looped as at 10, and the longitudinally engaging portions are covered by a sleeve 11. This sleeve is mounted on the leader in the same manner as described above, that is, it is subjected to the action of a dilator solution so that it becomes pliable and stretchable in the manner of soft rubber, whereupon it is properly positioned and allowed to shrink to its original size. As may be noted, the free end of the leader may be folded over as shown at 12 in Fig. 3, so that there are three longitudinally engaging leader portions. This construction may also be used at the hook end of the leader if desired.

In Fig. 4, I have illustrated a modification particularly adapted to leader connections with hooks having eyes that are too small to receive two thicknesses of the leader. In this instance, the hook shank is designated 13, and the leader 14, the hook eye being designated 15. The end of the leader 14 is simply extended through the eye, so as to lie along the hook shank as shown at 16. A sleeve 17 is dilated, and stretched over the shank and leader, so that it surrounds shank 13, eye 15, and portions of the leader disposed to either side of the eye 15. On shrinking of the sleeve, all the parts will be firmly bound.

Referring to Fig. 5, another modification is here illustrated. In this modification, the hook is designated 18, the leader 19, and the hook eye 20. The leader is extended through the hook eye, and then along the shank of the hook so as to have its end 21 in longitudinal contact with the hook shank. The sleeve in this case engages the leader similarly to the construction illustrated in Figs. 1 and 2, being just passed through the hook eye 20. Another sleeve 24 is passed over the hook shank, and is contracted against the longitudinally contacting hook shank and end 21 of the leader. In Fig. 6, a construction is illustrated which is well adapted for connections in which the hook 26 has an eye 27 that is large enough to receive two strands of the leader 28, but not large enough to receive a sleeve 29 in addition to said strands. In this instance, the sleeve 29 is dilated as described above, passed over the interengaging hook eye and leader loop portions, and extends both along the shank of the hook and the folded over portions of the leader, surrounding the entire connection. The sleeve 29 is then permitted to shrink to secure the connection tightly. The sleeve in Figs. 4 and 6, it may be noted, is of a sufficient length to cause it to extend in opposite directions away from the enlargement defined by the inter-engaged hook and leader, so that when the sleeve is shrunk, the ends of its bore are smaller in diameter than the center portion of its bore, in which center portion said enlargement is lodged.

It has been found that utilizing a construction as described, a tight compression of the parts results which will be permanent, and which shows no signs of wear despite hard use. The plastic sleeves are not affected by fresh or salt water, do not fray as do the ends of the conventional thread wrapped connection, and are applied easily and inexpensively.

All the sleeves illustrated are of the thermoplastic class and type of plastics. The dilator solution can vary as to chemical analysis, this being any solution which can act upon a thermoplastic to which it is applied in a manner to permit said thermoplastic to stretch, after which contraction sets in when the solution dries. I have found a solution of the type marketed by the General Electric Company, Schenectady, New York, under the name "Service Solvent" to be well suited for this purpose.

What is claimed is:
1. The method of joining a leader to a fish hook having an eye and a shank which method includes inserting through the eye of the fish hook an end of the leader, positioning the portion of the leader adjacent said end against the shank of the hook, encircling with a plastic sleeve the eye and the portion of the leader lying against the shank, and shrinking said sleeve adjacent its opposite ends about the leader and about the shank.

2. The method of joining a leader to a fish hook having an eye and a shank which method includes inserting through the eye of the fish hook an end of the leader, positioning the portion of the leader adjacent said end against the shank of the hook, with a plastic sleeve encircling the portions of the leader and fish hook which lie adjacent one another, and shrinking said sleeve adjacent opposite ends of the adjacent portions into intimate contact with the leader and with the shank.

3. The method of joining a leader to a fish hook having an eye and a shank which method includes inserting through the eye of the fish hook an end of the leader, positioning the portion of the leader adjacent said end against the shank of the hook with a plastic sleeve encircling the portions of the leader and fish hook which lie adjacent one another, shrinking an intermediate portion of said sleeve into intimate contact with the eye and the adjacent portions of the shank and leader, and shrinking portions of the sleeve adjacent the intermediate portion thereof into intimate contact with the shank and with the leader.

WINFIELD W. JONES.

REFERENCES CITED

The following references are of record in the file of this patent:

UNITED STATES PATENTS

| Number | Name | Date |
|---|---|---|
| 469,015 | Hemenway | Feb. 16, 1892 |
| 469,016 | Hemenway | Feb. 16, 1892 |
| 831,211 | Buckingham, Jr. | Sept. 18, 1906 |
| 2,201,706 | Sukohl | May 21, 1940 |
| 2,249,091 | Robinson et al. | July 15, 1941 |

FOREIGN PATENTS

| Number | Country | Date |
|---|---|---|
| 26,727 of 1906 | Great Britain | Feb. 28, 1907 |
| 14,042 | Great Britain | July 2, 1908 |